United States Patent
Koyama

(10) Patent No.: US 7,886,002 B2
(45) Date of Patent: Feb. 8, 2011

(54) APPLICATION COLLABORATION SYSTEM, COLLABORATION METHOD AND COLLABORATION PROGRAM

(75) Inventor: Kazuya Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 12/053,352

(22) Filed: Mar. 21, 2008

(65) Prior Publication Data
US 2008/0244581 A1 Oct. 2, 2008

(30) Foreign Application Priority Data
Mar. 29, 2007 (JP) ............................. 2007-087709

(51) Int. Cl.
*G06F 15/16* (2006.01)
(52) U.S. Cl. ...................... 709/204; 715/742
(58) Field of Classification Search ................... None
See application file for complete search history.

(56) References Cited

U.S. PATENT DOCUMENTS

| | | | | |
|---|---|---|---|---|
| 7,653,193 | B2 * | 1/2010 | Pfleging et al. | 379/205.01 |
| 2002/0118808 | A1 * | 8/2002 | Kelleher et al. | 379/202.01 |
| 2003/0172007 | A1 * | 9/2003 | Helmolt et al. | 705/28 |
| 2004/0148342 | A1 * | 7/2004 | Cotte | 709/203 |
| 2005/0007965 | A1 * | 1/2005 | Hagen et al. | 370/260 |
| 2005/0015742 | A1 * | 1/2005 | Wood et al. | 717/101 |
| 2006/0053029 | A1 * | 3/2006 | Butler | 705/1 |
| 2006/0064422 | A1 * | 3/2006 | Arthurs et al. | 707/10 |
| 2006/0242632 | A1 * | 10/2006 | Orsolini et al. | 717/140 |
| 2007/0081651 | A1 * | 4/2007 | Iyer et al. | 379/202.01 |
| 2007/0172046 | A1 * | 7/2007 | Pfleging et al. | 379/202.01 |
| 2008/0071868 | A1 * | 3/2008 | Arenburg et al. | 709/206 |
| 2008/0154601 | A1 * | 6/2008 | Stifelman et al. | 704/251 |

FOREIGN PATENT DOCUMENTS

| | | |
|---|---|---|
| JP | 2002-351827 A | 12/2002 |
| JP | 2004-38759 A | 2/2004 |
| JP | 2005-327150 A | 11/2005 |
| JP | 2006-107012 A | 4/2006 |
| WO | 2004-114142 A1 | 12/2004 |

\* cited by examiner

*Primary Examiner*—Bunjob Jaroenchonwanit
(74) *Attorney, Agent, or Firm*—Sughrue Mion, PLLC

(57) ABSTRACT

An application collaboration system for allowing a portal application executed on a Web server and a client application executed on a client terminal to collaborate with each other, the application collaboration system including:
a collaboration information storage unit that stores collaboration information including information indicating an application and call information used to call a process to be executed by the application in association with information indicating a condition to extract the collaboration information;
an execution location information storage unit that stores execution location information indicating an apparatus where the application is executed in association with the information indicating an application;
an information extraction unit that executes a process to extract collaboration information matching said condition from said collaboration information storage unit and acquires execution location information corresponding to the information indicating an application included in the extracted collaboration information from said execution location information storage unit; and
a collaboration information notification unit that notifies the apparatus indicated by the execution location information acquired by said information extraction unit of the process indicated by the extracted collaboration information.

12 Claims, 16 Drawing Sheets

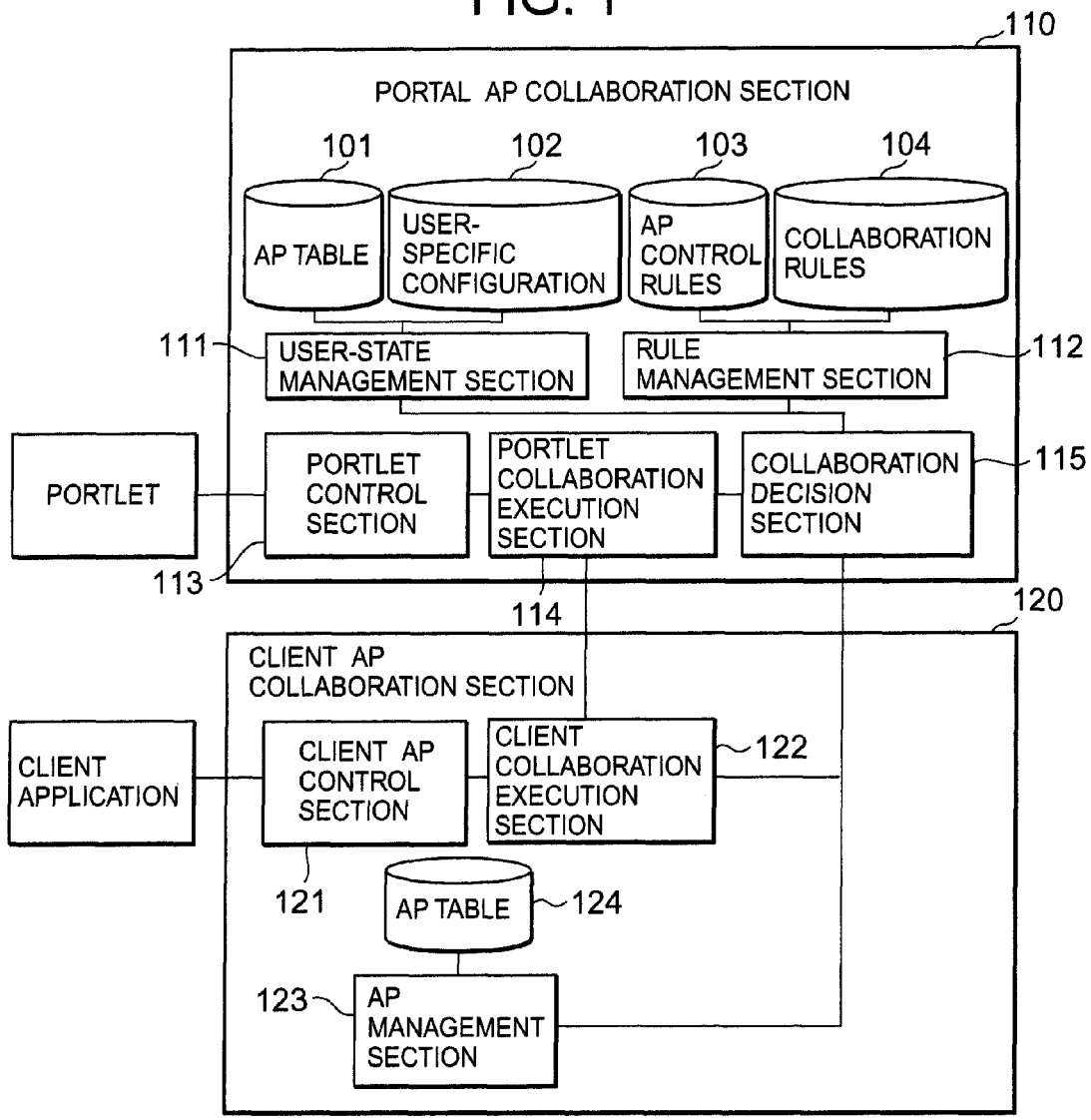

FIG. 3

| AP CONTROL RULES | | | | |
|---|---|---|---|---|
| APPLICATION NAME | APPLICATION TYPE | EXECUTION LOCATION | INTERFACE NAME | INTERFACE NAME IMPLEMENTATION |
| APPLICATION NAME 1 | APPLICATION TYPE 1 | LOCATION 1 | INTERFACE NAME 1 | IMPLEMENTATION 11 |
| | | | INTERFACE NAME 12 | IMPLEMENTATION 12 |
| | | | ... | ... |
| APPLICATION NAME 2 | APPLICATION TYPE 2 | LOCATION 2 | INTERFACE NAME 21 | IMPLEMENTATION 21 |
| | | | INTERFACE NAME 22 | IMPLEMENTATION 22 |
| ... | ... | ... | ... | ... |

FIG. 4

| COLLABORATION RULES | | |
|---|---|---|
| ACTIVATION CONDITION | EXECUTION CONDITION | COLLABORATION IMPLEMENTATION |
| ACTIVATION CONDITION 1 | EXECUTION CONDITION 1 | COLLABORATION IMPLEMENTATION 1 |
| ACTIVATION CONDITION 2 | EXECUTION CONDITION 2 | COLLABORATION IMPLEMENTATION 2 |
| ACTIVATION CONDITION 3 | EXECUTION CONDITION 3 | COLLABORATION IMPLEMENTATION 3 |
| ... | ... | ... |

FIG. 5

| AP TABLE |
|---|
| AP NAME |
| AP NAME 1 |
| AP NAME 2 |
| AP NAME 3 |
| ... |

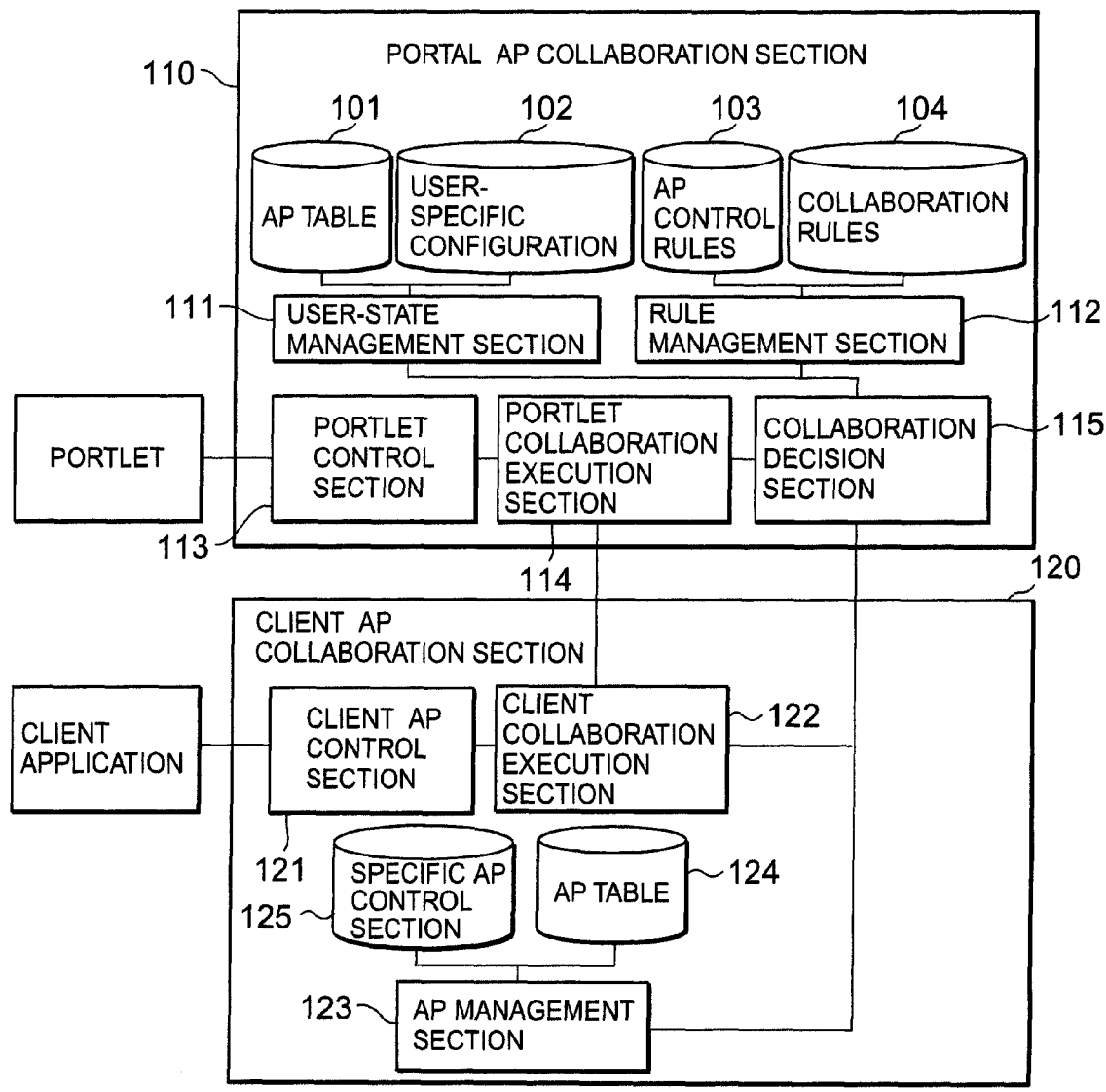

FIG. 10

| SPECIFIC AP CONTROL RULES | | | |
|---|---|---|---|
| APPLICATION NAME | APPLICATION TYPE | INTERFACE NAME | INTERFACE IMPLEMENTATION |
| APPLICATION NAME 1 | APPLICATION TYPE 1 | INTERFACE NAME 11 | IMPLEMENTATION 11 |
| | | INTERFACE NAME 12 | IMPLEMENTATION 12 |
| | | ... | ... |
| APPLICATION NAME 2 | APPLICATION TYPE 2 | INTERFACE NAME 21 | IMPLEMENTATION 21 |
| | | INTERFACE NAME 22 | IMPLEMENTATION 22 |
| ... | ... | ... | ... |

FIG. 17

| USER-SPECIFIC CONFIGURATION | |
|---|---|
| APPLICATION TYPE | APPLICATION NAME |
| SCHEDULER | MYSCHEDULER |
| MEETING DATE ARRANGEMENT | MEETING DATE ARRANGEMENT PORTLET |
| MALI MANAGEMENT | MALI MANAGEMENT PORTLET |

FIG. 18

| AP CONTROL RULES | | | | | |
|---|---|---|---|---|---|
| APPLICATION NAME | APPLICATION TYPE | EXECUTION LOCATION | INTERFACE NAME | INTERFACE NAME IMPLEMENTATION | |
| MYSCHEDULER | SCHEDULER | CLIENT | OBTAIN PLAN | DISPLAY {MONTH AND DAY} EXTRACT(PLAN); | |
| SCHEDULE MANAGEMENT PORTLET | SCHEDULER | PORTAL | OBTAIN PLAN | CALL {OBTAIN PLAN (MONTH AND DAY)} | |
| MEETING DATE ARRANGEMENT PORTLET | MEETING DATE ARRANGEMENT | PORTAL | OBTAIN CANDIDATE DATE | CALL {OBTAIN CANDIDATE DATE ()} | |
| | | | INPUT ANSWER | CALL {INPUT ANSWER(Y/N) } | |
| MAIL MANAGEMENT PORTLET | MAIL MANAGEMENT | PORTAL | CREATE NEW MAIL | CALL {NEW MAIL()} | |

FIG. 19

| COLLABORATION RULES | ACTIVATION CONDITION | EXECUTION CONDITION | COLLABORATION IMPLEMENTATION |
|---|---|---|---|
| COLLABORATION RULE 1 | INITIAL STATE | | OPEN($(MAIL MANAGEMENT SCREEN)); |
| COLLABORATION RULE 2 | MEETING DATE ARRANGEMENT,SCREEN =ARRANGEMENT REQUEST | AVAILABLE (SCHEDULER) | MEETING DATE ARRANGEMENT MEETING= GET(MEETING DATE ARRANGEMENT); DATE CANDIDATE DATE=MEETING,OBTAIN CANDIDATE DATE (); SCHEDULER SCHD=OPEN(SCHEDULER); SCHEDULEITEM ITEM=SCHD,OBTAIN SCHEDULE(CANDIDATE DATE); IF(ITEM=NULL) RESULT=TRUE;ELSE RESULT=FALSE; MEETING INPUT ANSWER(RESULT); |
| COLLABORATION RULE 3 | MEETING DATE ARRANGEMENT,SCREEN =ARRANGEMENT REQUEST | UNAVAILABLE (SCHEDULER) | MEETING DATE ARRANGEMENT MEETING= GET(MEETING DATE ARRANGEMENT); DATE CANDIDATE DATE=MEETING,OBTAIN CANDIDATE DATE (); GALENDAR CAL=OPEN (CALENDAR ); CAL.DISPLAY(CANDIDATE DATE); |

APPLICATION COLLABORATION SYSTEM, COLLABORATION METHOD AND COLLABORATION PROGRAM

This application is based upon and claims the benefit of priority from Japanese patent application No. 2007-087709, filed on Mar. 29, 2007, the disclosure of which is incorporated herein in its entirety by reference.

BACKGROUND OF THE INVENTION

1. Field of the Invention

The present invention relates to an application collaboration system that realizes a portal screen to provide an environment to use a business system, and particularly to an application collaboration system, an application collaboration method and an application collaboration program that control a collaboration of even an application on a client.

2. Description of the Related Art

As a system allowing a user to easily operate a plurality of application systems and Web sites being operational on the World Wide Web (hereinafter, the Web), a Web application referred to as a Web portal site (hereinafter, a Web portal) has been provided.

A related Web portal, in order a user can easily see a large number of applications and information contained in them, displays images of the plurality of applications together in a single screen. Generally, a screen element corresponding to each application constituting a screen layout of a Web portal is referred to as a portlet. A screen layout of a Web portal is formed in various combinations of a plurality of arranged portlets. A system is also disclosed that not only displays a plurality of portlets, but also can select an application to be displayed or change displayed content, depending on a role and status of a user. For example, Japanese Patent Laid-Open No. 2006-107012 discloses an approach to decision of screen configuration using user definition information. Japanese Patent Laid-Open No. 2005-327150 discloses an approach to configuration of a screen layout according to the ability of a terminal used by a user.

Meanwhile, as a more developed form of the Web portal, some inventions are disclosed that aim to more actively assist a user to operate a plurality of applications and provide a comfortable environment to use the applications by not only making content of the applications easy-to-view for a user, but also by partly automating the operation of the applications or making the plurality of originally independent applications collaborate with one another. For example, Japanese Patent Laid-Open No. 2002-351827 discloses a means that saves details of user personal information in a Web portal when the information is registered in an application, and that automatically inputs the saved content when similar information is registered in other applications. Japanese Patent Laid-Open No. 2004-38759 discloses a means that realizes collaboration among the portlets such as synchronizing portlets with one another or transferring data.

Also, a means that allows a Web portal to be collaborated with a system other than a Web application is disclosed. For example, WO2004-114142 discloses an approach to collaboration between a Web portal and an e-mail client in a client terminal.

However, the approaches or means described in the above have the following problems.

A first problem is that a Web portal and an application on a client terminal (hereinafter, referred to as a client application) cannot be made to appropriately collaborate with each other according to an environment on the client used by a user. Because all Web applications provided on the Web portal are installed in the Web portal or other servers and the client can use any application as long as it has a Web browser, the Web portal can decide and execute screen configuration and collaboration among portlets without considering the client environment. However, the Web portal according to the related arts has no way to know what applications are installed in each client, even though available client applications depend on which client is used because each set of client applications is installed in each client terminal. Therefore, the Web portal cannot decide appropriate screen configuration or a collaboration method between the applications depending on the available client application types.

A second problem is that the client applications cannot be collaborated with the Web portal in various forms. WO2004-114142 discloses automation of processes to activate and login to the client applications. However, the scheme described in WO2004-114142 can only realize display of related applications on a screen, as is disclosed in Japanese Patent Laid-Open No. 2006-107012 or Japanese Patent Laid-Open No. 2005-327150. For example, assistance of user tasks in various collaboration, such as changing a screen layout in cooperation with a Web portal in a client application after the activation of it, or retrieving data displayed in a screen layout of a client application and passing the data to a portlet on a Web portal, is impossible. This is because a general client application is only assumed to be used by a user via a graphical user interface (hereinafter, referred to as a GUI), hence, although the client application can be activated, it is impossible to transit to a different screen layout by operating a button on the screen or retrieve a character string displayed on the screen via other programs. Some client applications prepare a dedicated interface to be used by the other programs separately from a GUI, but not all client applications have such a function.

A third problem is that it is complicated to handle a large number of client applications. Many client applications have similar objects or functions as client applications like a scheduler, an e-mail client or a messenger, for example, and in many cases a user selects his/her preferring client application and installs it in his/her client for use. However, client applications differ from one another in most of particular functions or operations even if they are similar in their objects or functions. Further, some client applications differ from one another in their functions or operations due to different versions even if they have the same name. When a system operate client applications, it must have rules considering all of such particular differences for each of the client applications. A large amount of labor will be required to create such collaboration rules among applications.

SUMMARY OF THE INVENTION

An exemplary object of the present invention is to provide a system for application collaboration between a Web portal and a client application, an application collaboration method and an application collaboration program that can execute appropriate and various collaboration between a Web portal and a client application depending on an application installed in a client used by a user.

An application collaboration system according to an exemplary aspect of the invention is an application collaboration system for allowing a portal application executed on a Web server and a client application executed on a client terminal to collaborate with each other, being characterized by including: a collaboration information storage unit that stores collaboration information including information indicating an application and call information used to call a process to be executed by the application in association with information indicating a condition to extract the relevant collaboration information; an execution location information storage unit that stores execution location information indicating an apparatus to execute the relevant application in association with the information indicating an application; an information extraction unit that executes a process to extract collaboration information matching the condition from the collaboration information storage unit and acquires execution location information corresponding to the information indicating an application included in the extracted collaboration information from the execution location information storage unit; and a collaboration information notification unit that notifies the apparatus indicated by the execution location information acquired by the information extraction unit of the process indicated by the extracted collaboration information.

It is possible to analyze a GUI screen to extract data or to send an event following user operation so as to operate a client application that is not assumed to be operated by other programs.

BRIEF DESCRIPTION OF THE DRAWINGS

FIG. 1 is a block diagram showing a configuration example of an application collaboration system according to a first exemplary embodiment;

FIG. 2 is an illustrative drawing showing an example of a user-specific configuration table;

FIG. 3 is an illustrative drawing showing an example of an AP control rule table;

FIG. 4 is an illustrative drawing showing an example of a collaboration rule table;

FIG. 5 is an illustrative drawing showing an example of an AP table;

FIG. 8 is an illustrative drawing showing an example of an AP table according to a second exemplary embodiment;

FIG. 9 is a block diagram showing a configuration example of an application collaboration system according to a third exemplary embodiment;

FIG. 10 is an illustrative drawing showing an example of a specific AP control rule table;

FIG. 17 is an illustrative drawing showing a registration example of a user-specific configuration table;

FIG. 18 is an illustrative drawing showing a registration example of an AP control rule table; and FIG. 19 is an illustrative drawing showing a registration example of a collaboration rule table.

EXEMPLARY EMBODIMENT

Figure 6:
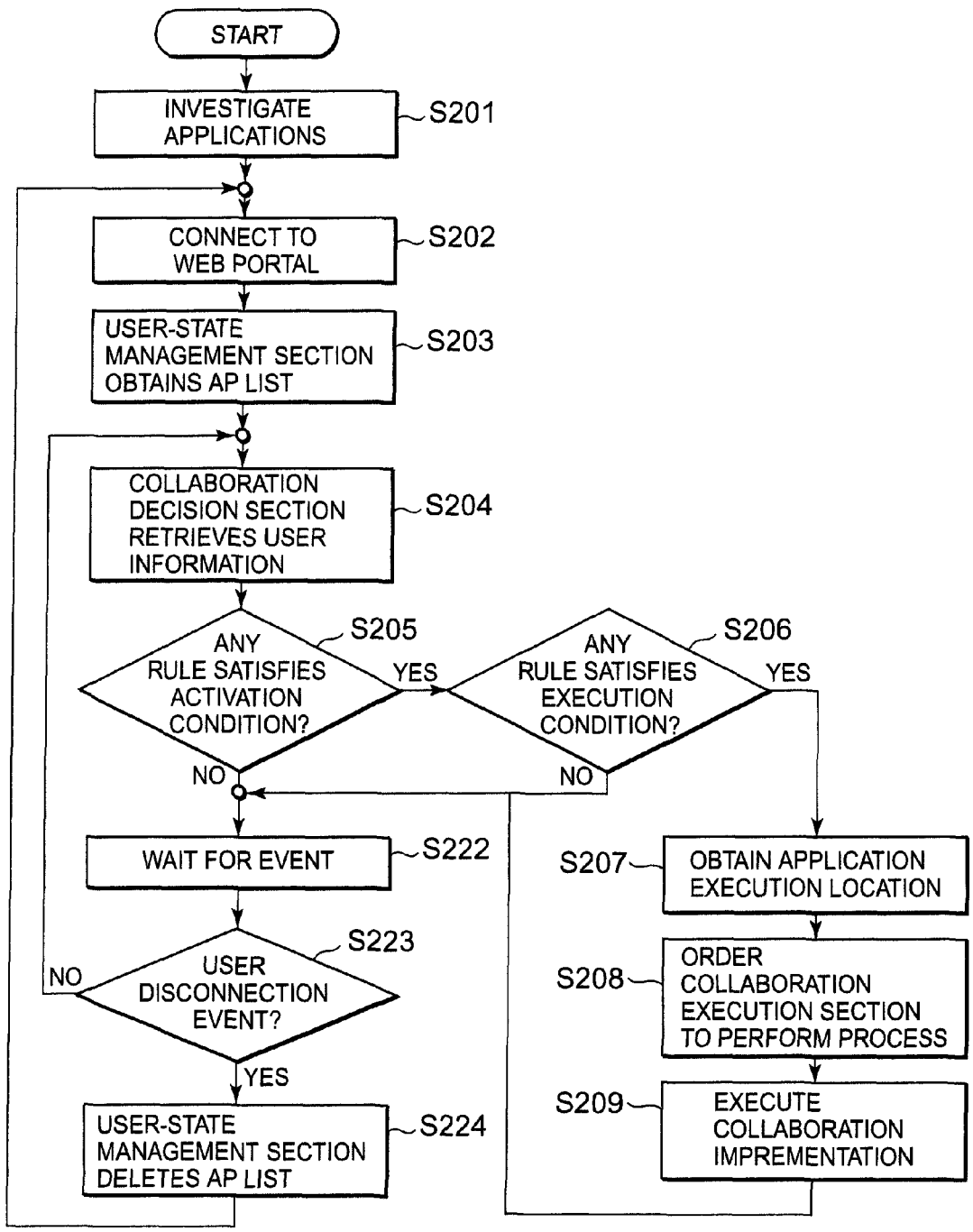
FIG. 6 is a flowchart showing an example of the operation of the application collaboration system according to the first exemplary embodiment.

Hereinafter, an exemplary embodiment will be described in details with reference to the drawings. FIG. 1 is a block diagram showing a configuration example of an application collaboration system according to a first exemplary embodiment. The application collaboration system shown in FIG. 1 includes a portal AP collaboration section 110 installed in a Web portal and a client AP collaboration section 120 installed in a client terminal.

The portal AP collaboration section 110 includes a portlet control section 113, a portlet collaboration execution section 114, a rule management section 112, a user-state management section 111 and a collaboration decision section 115.

The user-state management section 111 includes an AP table 101 and a user-specific configuration table 102. The rule management section 112 includes an AP control rule table 103 and a collaboration rule table 104.

The client AP collaboration section 120 includes a client AP control section 121, a client collaboration execution section 122 and an AP management section 123. The AP management section 123 includes an AP table 124.

FIG. 2 is an illustrative drawing showing an example of the user-specific configuration table 102. Referring to FIG. 2, the user-specific configuration table 102 describes application names used by a user for each of application types. That is, user-specific configuration information including the types of applications and names of the applications is set in the user-specific configuration table 102. The user-specific configuration information is information being previously set, for example, set at the same time as generation of a user account at a portal. The user-specific configuration information can also be changed appropriately.

FIG. 3 is an illustrative drawing showing an example of the AP control rule table 103. Referring to FIG. 3, AP control rules including names of applications, the types of the applications, execution locations, interface names of the respective application types and interface implementations are previously set in the AP control rule table 103. The AP control rules are previously set in the AP control rule table 103 by an operator or user of a portal site, for example.

FIG. 4 is an illustrative drawing showing an example of the collaboration rule table 104. Referring to FIG. 4, collaboration rules including activation conditions, execution conditions and collaboration implementations are set in the collaboration rule table 104.

A collaboration implementation, which is information indicating a collaboration process among the applications, is an execution code such as, for example, scripting or a program code. For example, information indicating each process included in a collaboration implementation is information indicating a particular process in a particular type or application. That is, a collaboration implementation is information including an application type and an interface name, for example. The application types and interface names included in the collaboration implementations are the same information as the information included in the AP control rules. Hereinafter, each process indicated by a collaboration implementation is referred to as an individual process.

Meanwhile, an interface implementation is information associated with an application name and an interface name, and is information indicating a particular process in the application. An interface implementation is an execution code such as scripting or a program code, for example.

An activation condition is information indicating timing to activate a collaboration implementation and, for example, is information indicating a condition on an event notified when there is some change on a screen. An execution condition is information indicating an environment required to execute the collaboration implementation. Specifically, it is information indicating what application needs to be installed, for example.

The AP control rule table 103 includes AP control rules corresponding to an application type and an interface name included in a collaboration implementation. The AP control rule table 103 can also include AP control rules that do not correspond to the application type and the interface name included in the collaboration implementation. For example, the table 103 can previously include AP control rules that may be required in the future.

FIG. 5 is an illustrative drawing showing an example of the AP tables 101 and 124. Referring to FIG. 5, an AP list including AP names is set in the AP tables 101 and 124.

These operate generally as described below.

The portlet control section 113, receiving a control order from the portlet collaboration execution section 114, retrieves an AP control rule from the rule management section 112 and executes the rule to control a portlet. Herein, the phrase "execute an AP control rule" means to execute a process indicated by a collaboration implementation included in the AP control rule.

The portlet collaboration execution section 114, according to an order from the collaboration decision section 115, executes a process to call portlet control one time or more and, at the same time, communicates with the client collaboration execution section 122, as a part of the process.

The rule management section 112 manages the AP control rules set in the AP control rule table 103 and the collaboration rules set in the collaboration rule table 104.

The user-state management section 111 manages user-specific configuration information set in the user-specific configuration table 102 and the AP list set in the AP table 101.

The collaboration decision section 115, receiving an event from the inside and outside of the collaboration decision section 115, decides a collaboration process to be executed by using the user-state management section 111 and the rule management section 112, and orders processes to be executed by the portlet collaboration execution section 114 and the client collaboration execution section 122, respectively.

The client AP control section 121, receiving an order from the client collaboration execution section 122, controls a client application by retrieving the AP control rule from the rule management section 112 and executing the rule. During the control, the section 121 also analyzes a GUI screen of the client application, extracts information and sends an event.

The client collaboration execution section 122, according to the order from the collaboration decision section 115, executes a process to call client application control one time or more and, at the same time, communicates with the portlet collaboration execution section 114, as a part of the process.

The AP management section 123 investigates in a client terminal and sets a list of installed applications as an AP list in the AP table 124.

If the portal AP collaboration section 110 is realized in a server apparatus, then the user-state management section 111, the rule management section 112, the portlet control section 113, the portlet collaboration execution section 114 and the collaboration decision section 115 are realized through execution of a program to realize such functions by a CPU equipped in the server apparatus. Otherwise, if the client AP collaboration section 120 is realized in a client terminal, then the client AP control section 121, the client collaboration execution section 122 and the AP management section 123 are realized through execution of a program to realize such functions by a CPU equipped in the client terminal.

Next, the operation of the first exemplary embodiment will be described with reference to the drawings. FIG. 6 is a flowchart showing an example of the operation of the application collaboration system according to the first exemplary embodiment.

First, the AP management section 123 investigates applications installed in a client and saves the result in the AP table 124 (step S201). The AP management section 123 extracts information of applications installed in a client terminal, for example, based on information stored in an installed application management function provided by the OS. The section 123 may also search a storage device in which the application is installed.

Next, when a user establishes connection to a Web portal via a browser (step S202), the user-state management section 111 obtains the AP list via the AP management section 123 and saves the list in the AP table 101 (step S203).

Next, the collaboration decision section 115 extracts the AP list and user-specific configuration information by using the user-state management section 111, extracts collaboration rules by using the rule management section 112 (step S204), and determines whether or not any collaboration rules satisfy a activation condition (step S205). If the collaboration decision section 115 determines that some collaboration rules satisfy the activation condition at step S205 (Y), it determines whether or not any of the collaboration rules satisfy an execution condition in the collaboration lures which satisfy the activation condition (step S206).

If the collaboration decision section 115 determines that some of the collaboration rules satisfy the execution condition (Y), then it analyzes description of collaboration implementations in the collaboration rules, and extracts application types in description of application control for each individual process. Then, the section 115 extracts application names corresponding to the extracted application types from user-specific configuration information. The collaboration decision section 115 extracts execution locations corresponding to the extracted application names from the AP control rule table 103 of the rule management section 112, and determines execution locations for each of the individual processes (step S207).

The collaboration decision section 115 notifies the portlet collaboration execution section 114 of individual processes to be executed at the portal among the processes described in the collaboration implementations, and notifies the client collaboration execution section 122 of individual processes to be executed at the client (step S208).

As a method of describing a collaboration implementation and a unit of an individual process in the description, various existing techniques are available. For example, a collaboration implementation is described in a procedural script language, and an individual process is equivalent to each line in the script. It is decided which of the portlet collaboration execution section 114 or the client collaboration execution section 122 executes each line (individual process) in the script, and the result is notified.

Figure 7:
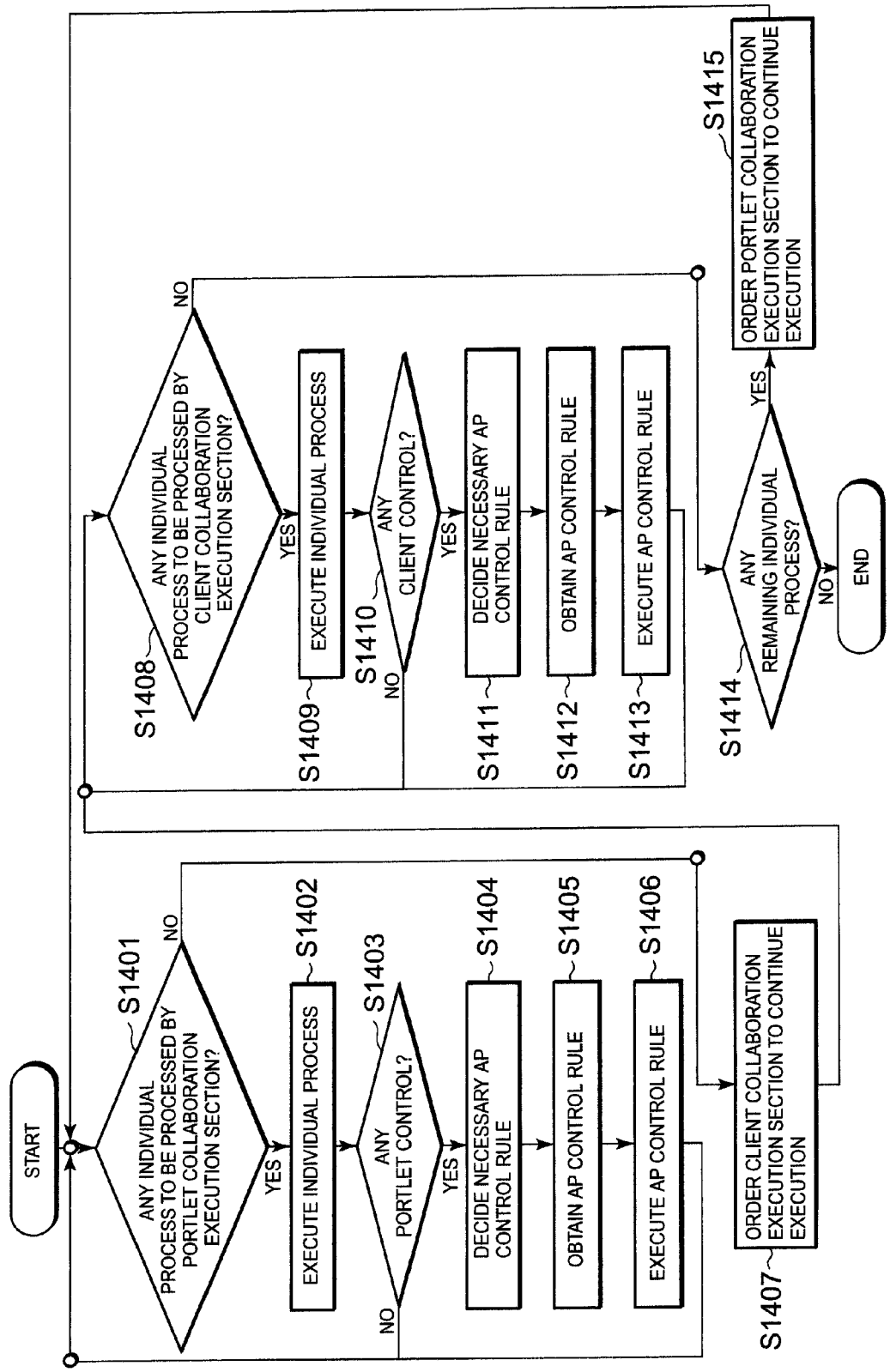
FIG. 7 is a flowchart showing an example of a collaboration implementation execution process.

Next, at step S209, the portlet collaboration execution section 114 and the client collaboration execution section 122 alternately execute the respectively ordered individual processes. FIG. 7 is a flowchart showing an example of the collaboration implementation execution process at step S209.

At step S1401, the portlet collaboration execution section 114 determines whether or not any individual processes should be executed. If the portlet collaboration execution section 114 determines that an individual process should be executed (Y), it executes the individual process (step S1402). The portlet collaboration execution section 114 determines whether or not the process includes control of portlet (step S1403). For example, if the individual process is a process for an application type corresponding to an application to be executed at the portal, the portlet collaboration execution section 114 determines that the process includes the control of portlet.

If the portlet collaboration execution section 114 determines that the process includes the portlet control (Y), it orders the portlet control section 113 to perform the control. For example, the portlet collaboration execution section 114 sends information indicating the individual process including the application type and an interface name to the portlet control section 113. The portlet control section 113 which has received the order decides a necessary AP control rule (step S1404), and obtains the AP control rule from the rule management section 112 (step S1405). That is, the portlet control section 113 extracts the application name corresponding to the received application type from user-specific configuration information. Then, the section 113 extracts an interface implementation corresponding to the extracted application name and the received interface name from the AP control rule and executes the implementation (step S1406).

The portlet collaboration execution section 114 returns to step S1401 to repeat the execution of the next individual process. If no individual process is found at step S1401 (N), then the portlet collaboration execution section 114 moves to step S1407 to order the client collaboration execution section 122 to continue the execution, and section 114 temporally stops the execution of the process.

At step S1408, the client collaboration execution section 122 determines whether or not any individual process should be executed. If the client collaboration execution section 122 determines that an individual process should be executed (Y), section 122 executes the individual process (step S1409). The client collaboration execution section 122 determines whether or not the process includes control of the client application (step S1410).

If the client collaboration execution section 122 determines that the process includes the client application control (Y), it orders the client AP control section 121 to perform the control. The client AP control section 121 which has received the order decides a necessary AP control rule (step S1411), and obtains the AP control rule from the rule management section 112 (step S1412). The client AP control section 121 executes the obtained AP control rule (step S1413), and returns to step S1408 to repeat execution of the next individual process. If no individual process is found at step S1408 (N), the flow moves to step S1414 to determine whether or not any further individual process should be executed. If it is determined that a further process should be executed (Y), the client AP control section 121 orders the portlet collaboration execution section 114 to continue the execution (step S1415). The client collaboration execution section 122 temporally stops the execution and repeats the processes from step S1401. The section 122 repeats the above until no further individual process should be executed at step S1414.

When the execution of the collaboration process ends at step S209 shown in FIG. 6, the collaboration decision section 115 waits for an event (step S222) and determines whether or not the occurred event is a user disconnection event (step S223). If the occurred event is an event other than the user disconnection at step S223 (N), the section 115 returns to step S204 to repeat the operation. If the occurred event is the user disconnection event (Y), the user-state management section 111 deletes contents of the AP table 101 (step S224).

As described in the above, according to the first exemplary embodiment, a Web portal or a client executes processes depending on an execution location of an application type used by a user, so a collaboration process can be performed appropriately. Additionally, a collaboration rule is information indicating a process for each application type and an AP control rule is information indicating a process for each application, so various collaboration processes can be easily performed.

In the above example, although the AP control rule and the collaboration rule are obtained from rule management section 112 each time, it is not limited to this case. The AP control rule and collaboration rule may be cached in the location where they are used.

Next, a second exemplary embodiment of the present invention will be described. According to the first exemplary embodiment, the user-state management section 111 obtains the AP list at user connection and deletes the AP list at the disconnection. However, according to the second exemplary embodiment, the section 111 does not need to delete the AP list at the disconnection.

According to the second exemplary embodiment, the user-state management section 111 manages an AP list for each client using a client ID being a client-specific identifier. The user-state management section 111 may not delete AP lists at the disconnection, and may obtain only differences between an AP list being previously obtained and set in the AP table 101 and another AP list set in the current AP table 124, both of which are AP lists corresponding to the same client ID, at the connection.

FIG. 8 is an illustrative drawing showing an example of the AP table 101 according to the second exemplary embodiment. According to the second exemplary embodiment, a communication load at the user connection can be reduced in a status that a large number of client applications are installed.

Next, a third exemplary embodiment will be described. According to the first exemplary embodiment, the AP management section 123 obtains all implementations for client application control from the rule management section 112. However, according to the third exemplary embodiment, the AP management section 123 may retain a part or all of client-specific AP control rules. For example, such configuration is possible that a position of an execution file of an application included in an interface implementation of an AP control rule of the rule management section 112 is parameterized and the AP management section 123 retains the value of the parameter.

FIG. 9 is a block diagram showing a configuration example of an application collaboration system according to the third exemplary embodiment. The AP management section 123 includes a specific AP control rule table 125. FIG. 10 is an illustrative drawing showing an example of the specific AP control rule table 125. As shown in FIG. 10, specific AP control rules each of which include a name of an application, the type of the application, interface names and interface implementations are set in the specific AP control rule table 125.

According to the third exemplary embodiment, the client AP collaboration section 120 can effectively perform an extraction process for the AP control rule.

Next, a fourth exemplary embodiment will be described. According to the first exemplary embodiment, the portlet collaboration execution section 114 and the client collaboration execution section 122 execute the collaboration process, and call the portlet control section 113 and the client AP control section 121, respectively. According to the fourth exemplary embodiment, only either one of the portlet collaboration execution section 114 or the client collaboration execution section 122 may execute the collaboration process, while the other may simply receive communication to call the control section. Such a mechanism can be easily realized by using a mechanism referred to as a remote procedure call (RPC), for example.

Figure 11:
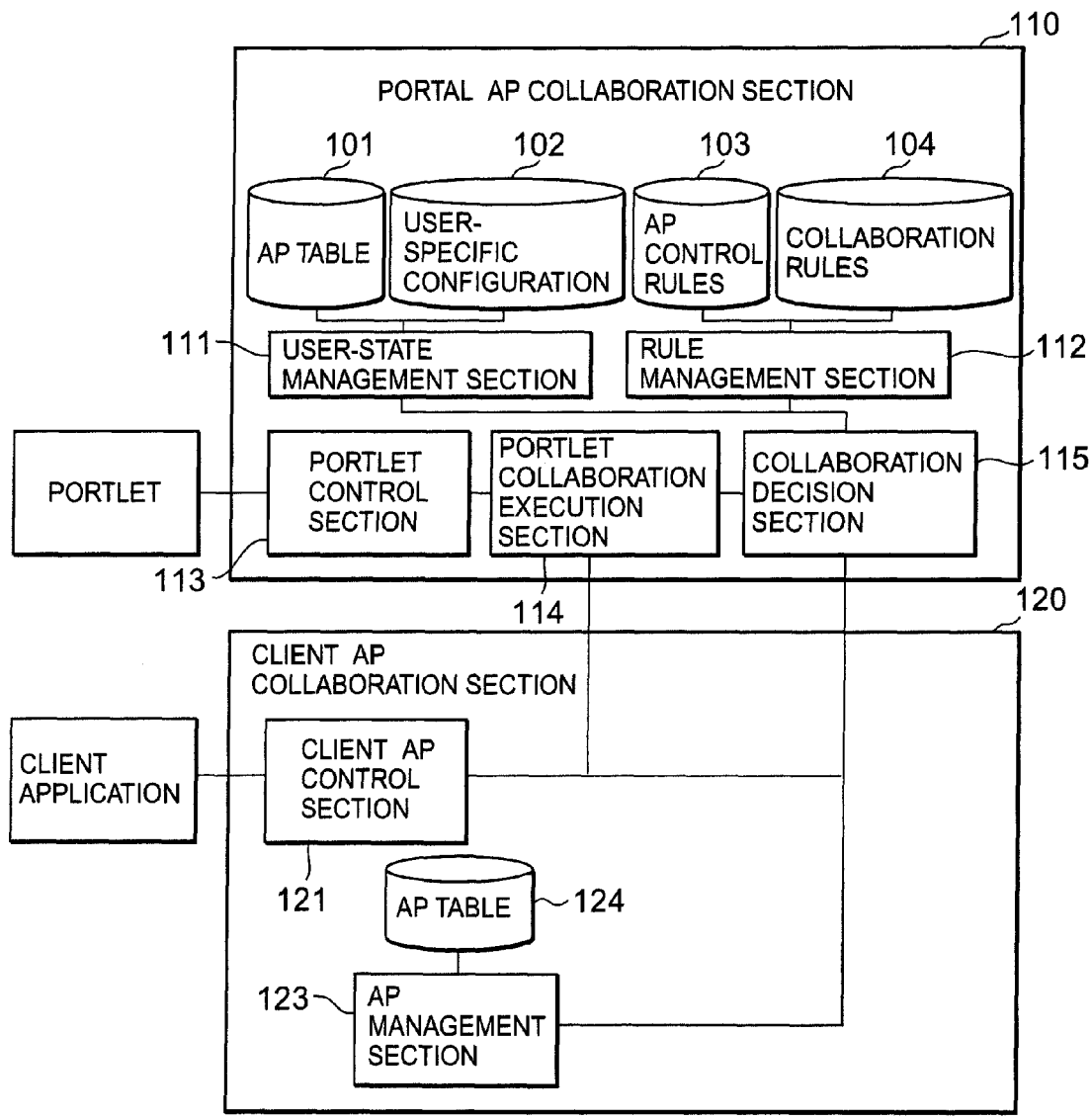
FIG. 11 is a block diagram showing a configuration example of an application collaboration system according to a fourth exemplary embodiment.
Figure 12:
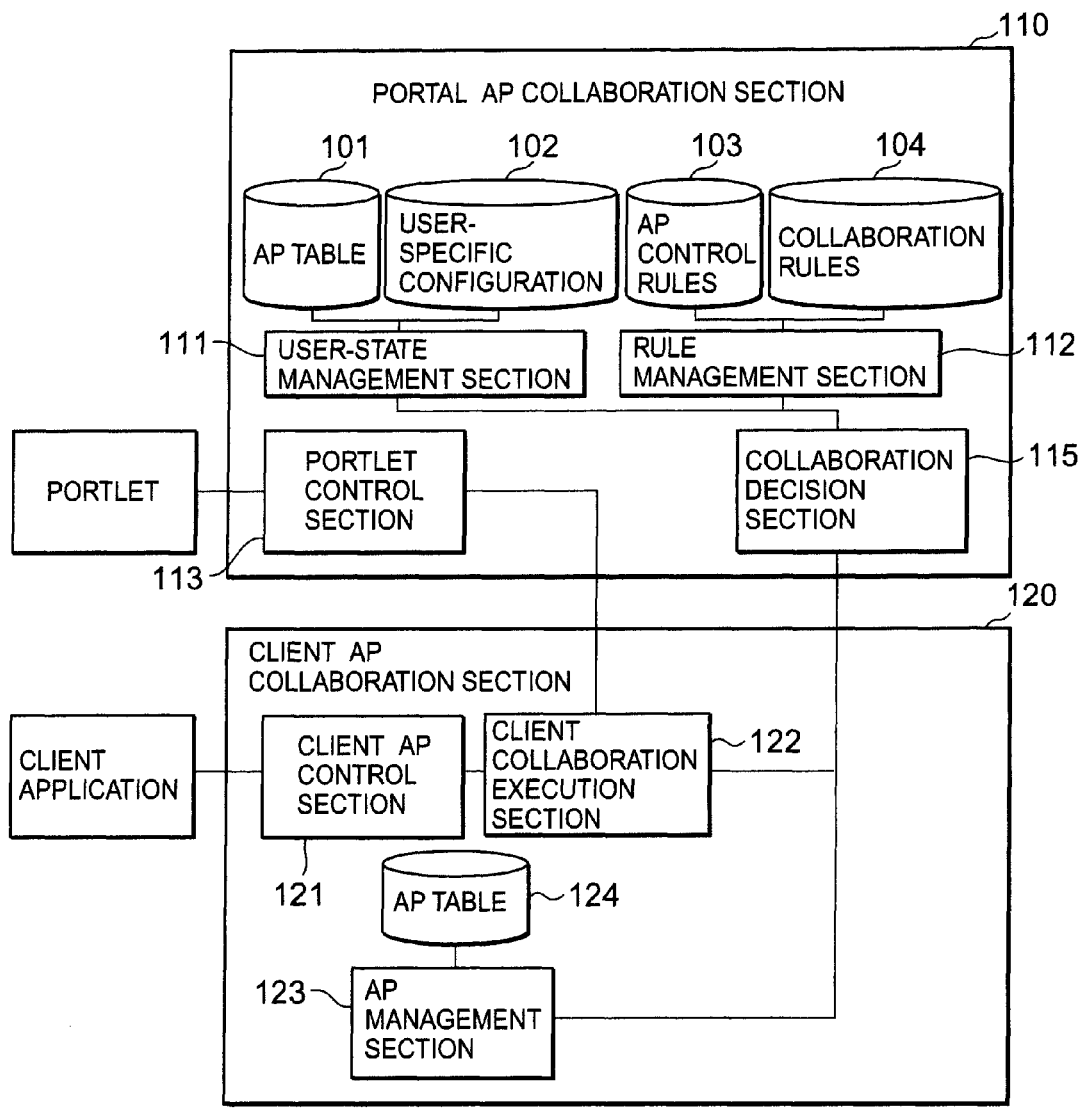
FIG. 12 is a block diagram showing a configuration example of the application collaboration system according to the fourth exemplary embodiment.

FIGS. 11 and 12 are block diagrams showing configuration examples of an application collaboration system according to the fourth exemplary embodiment.

The client AP collaboration section 120 of the application collaboration system shown in FIG. 11 differs from the first exemplary embodiment in not including the client collaboration execution section 122. In the application collaboration system shown in FIG. 11, only the portlet collaboration execution section 114 executes the collaboration process.

Meanwhile, the portal AP collaboration section 110 of an application collaboration system shown in FIG. 12 differs from the first exemplary embodiment in not including the portlet collaboration execution section 114. In the application collaboration system shown in FIG. 12, only the client collaboration execution section 122 executes the collaboration process.

Figure 13:
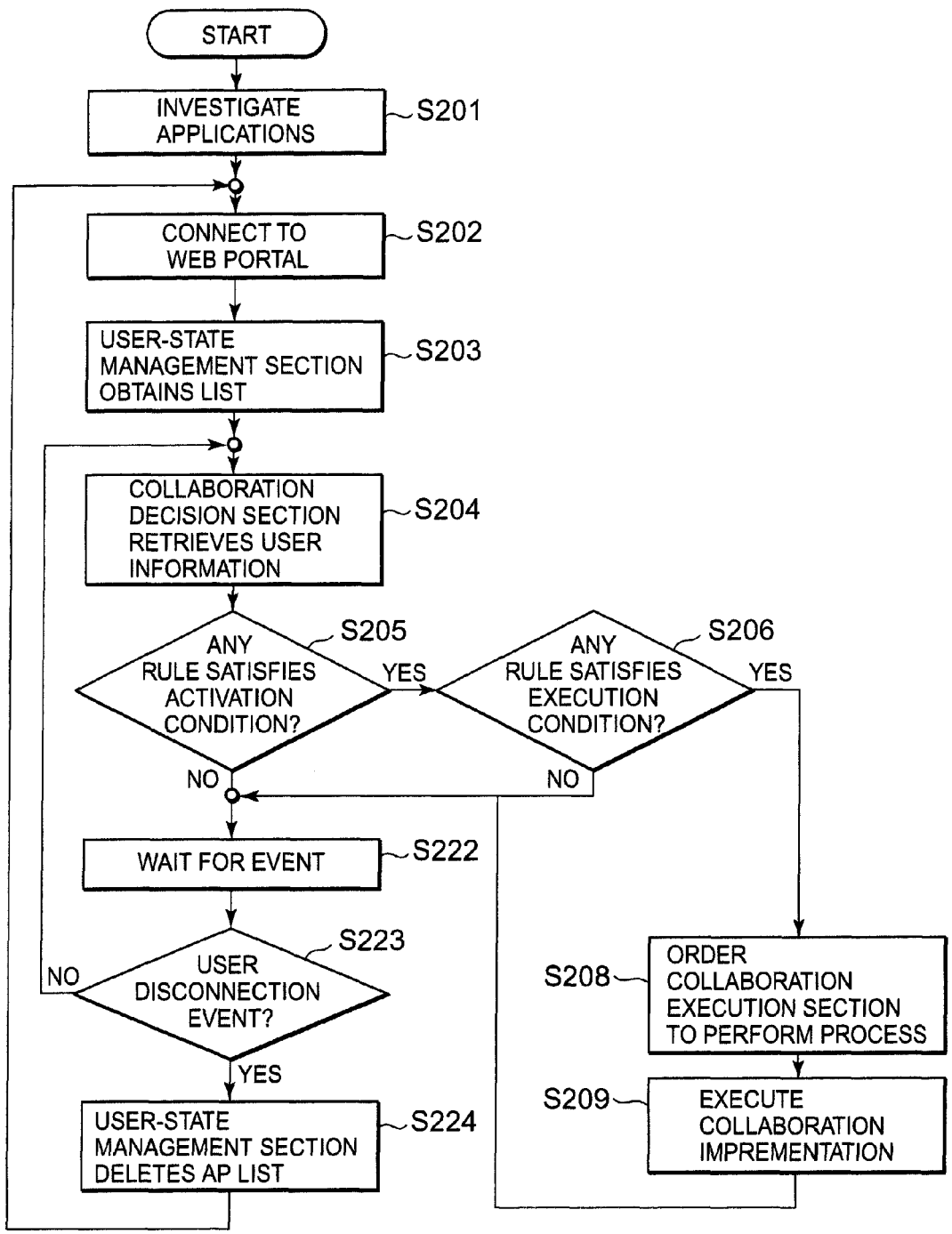
FIG. 13 is a flowchart showing an example of the operation of the application collaboration system according to the fourth exemplary embodiment.

FIG. 13 is a flowchart showing an example of the operation of the application collaboration system according to the fourth exemplary embodiment. As illustrated in FIG. 13, the application collaboration system according to the fourth exemplary embodiment orders the portlet collaboration execution section 114 or the client collaboration execution section 122 to perform all individual processes without obtaining a location to execute an application, differently from the process illustrated in FIG. 6.

Figure 14:
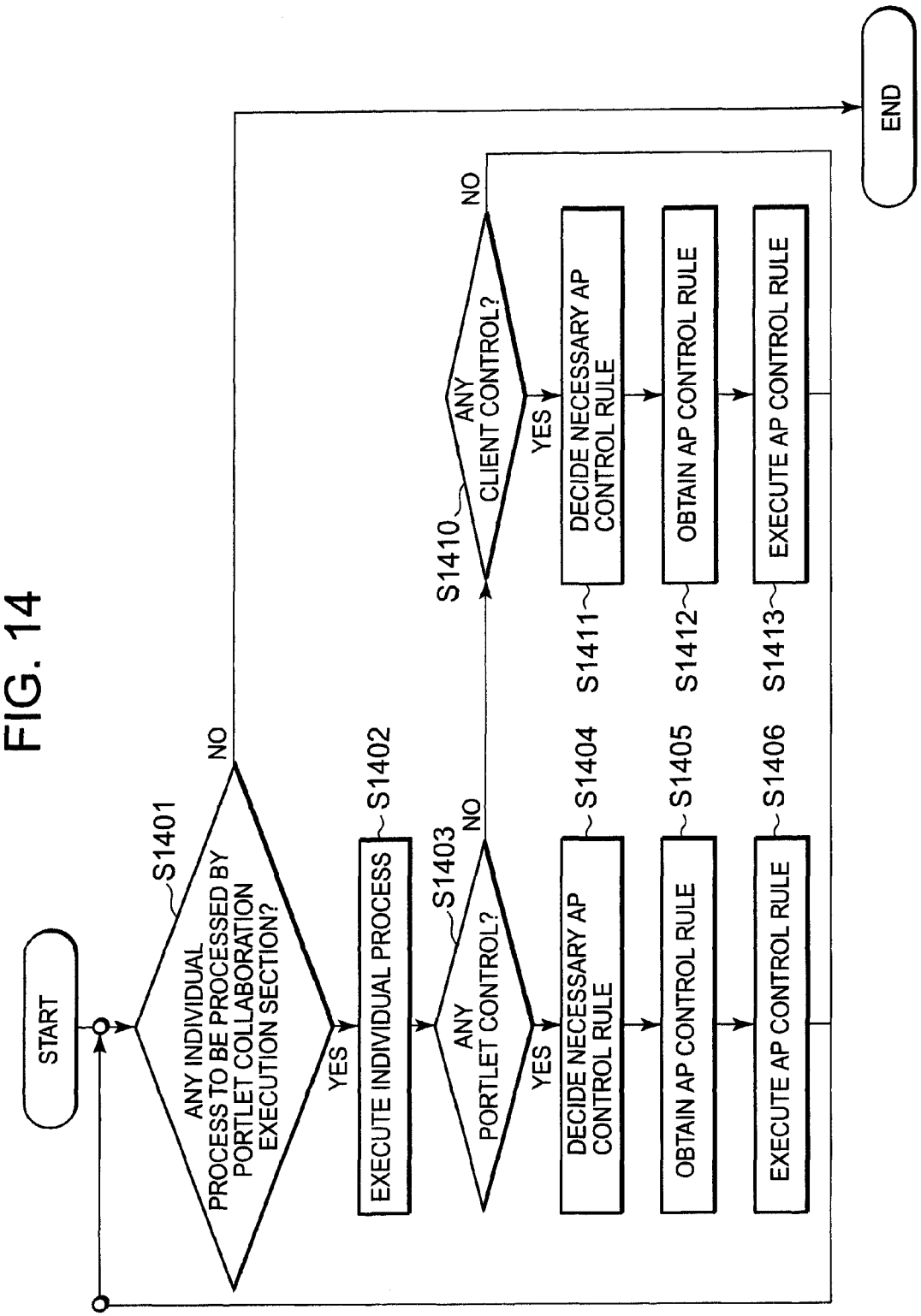
FIG. 14 is a flowchart showing an example of a collaboration implementation execution process.
Figure 15:
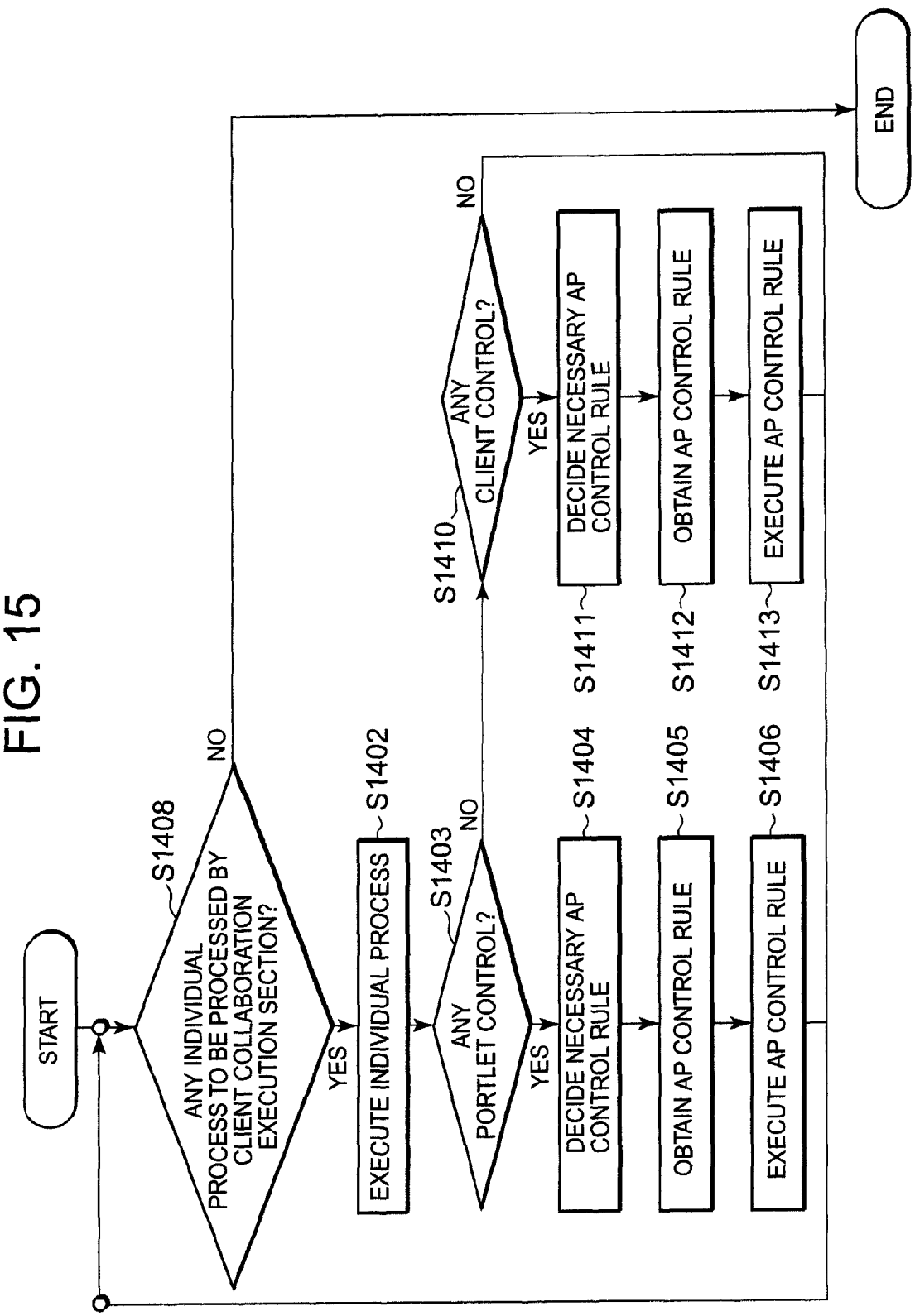
FIG. 15 is a flowchart showing an example of the collaboration implementation execution process.

FIGS. 14 and 15 are flowcharts showing examples of the collaboration implementation execution process at step S209. FIG. 14 shows a process when only the portlet collaboration execution section 114 executes the collaboration process. In an example shown in FIG. 14, the portlet collaboration execution section 114 executes all the individual processes and directly calls the portlet control section 113 and the client AP control section 121. FIG. 15 shows a process when only the client collaboration execution section 122 executes the collaboration process. In an example shown in FIG. 15, the client collaboration execution section 122 executes all the individual processes and directly calls the portlet control section 113 and the client AP control section 121.

According to the fourth exemplary embodiment, only either one of the portlet collaboration execution section 114 or the client collaboration execution section 122 executes the collaboration process, so the collaboration process can be effectively performed.

An application collaboration system according to a fifth exemplary embodiment of the present invention includes a specific-setting storage unit (for example, the user-specific configuration table 102) for storing application identification information (for example, an application name) that can identify the application in association with application type information (for example, an application type) indicating the type of an application available in a client terminal. A collaboration information storage unit stores collaboration information including the application type information as information indicating an application. An execution location information storage unit stores execution location information in association with the application identification information. An information extraction unit extracts application identification information corresponding to application type information included in extracted collaboration information from the specific-setting storage section, and can acquire execution location information corresponding to the extracted application identification information from the execution location information storage unit. According to such configuration, appropriate collaboration can be performed depending on an application used by the client terminal.

An application collaboration system according to a sixth exemplary embodiment of the present invention includes a control information storage unit (for example, the AP control rule table 103) for storing control information (for example, an interface implementation) indicating a process executed by an application in association with call information and application identification information. An information extraction unit extracts control information corresponding to extracted collaboration information and application identification information from the control information storage unit. A collaboration information notification unit can notify a process indicated by extracted collaboration information and control information. According to such configuration, various collaboration can be easily performed.

In an application collaboration system according to a seventh exemplary embodiment of the present invention, a control information storage unit stores control information indicating a process to analyze a GUI screen outputted by a client application, extracts the data and sends a GUI event. Such configuration can perform more various collaboration.

In an application collaboration system according to an eighth exemplary embodiment of the present invention, a control information storage unit stores control information indicating a process to analyze a GUI screen outputted by a portal application, extracts the data and sends a GUI event. Such configuration can perform more various collaboration.

In an application collaboration system according to a ninth exemplary embodiment of the present invention, a Web server includes a portlet execution unit (for example, the portlet collaboration execution section 114 and the portlet control section 113) that executes processes according to information notified by a collaboration information notification unit, while a client terminal includes a client execution unit (for example, the client collaboration execution section 122 and the client AP control section 121) that executes the processes according to the information notified by the collaboration information notification unit. Such configuration allows a portal application and a client application to collaborate with each other.

An application collaboration system according to a tenth exemplary embodiment of the present invention includes a portal AP collaboration section installed in a Web portal and a client AP collaboration section installed in a client terminal, for example. The portal AP collaboration section includes a portlet control section that controls portlets, a portlet collaboration execution section that executes a collaboration process among the portlets, a rule management section that manages collaboration rules, a user-state management section that manages a user state, and a collaboration decision section that decides a collaboration process to be executed depending on the status. Meanwhile, the client AP collaboration section includes a client AP control section that controls client applications, a client collaboration execution section that executes a collaboration process among the client applications, and an AP management section that manages applications installed in the client. Each of the AP management section and the user-state management section has an AP table. The rule management section also has an AP control rule table and a collaboration rule table.

In the system for collaboration among applications according to this embodiment, first, the AP management section investigates in an application installed in the client, and saves the result in its own AP table. The section has a common interface to make characteristic functions of each application type available by a collaboration rule, and an AP control rule to realize the interface for each application to be controlled in the AP control rule table. The collaboration rule table has collaboration rules to realize the collaboration process by using the common interface for each application type.

When a user establishes connection to a Web portal using a browser, the user-state management section obtains contents of the AP table from the AP management section of the client AP collaboration section of a connecting client and saves the contents in its own AP table. The collaboration decision section decides collaboration to be executed depending on an event such as creation of the initial screen, user operation or a change of the state of an application, in which the collaboration decision section decides a collaboration process to be executed by considering the contents of the AP table saved in the user-state management section. The decided collaboration process is divided to a process to be executed on the Web portal and a process to be executed on the client. The process to be executed on the Web portal is notified to the portlet collaboration execution section, while the process to be executed on the client is notified to the client collaboration execution section. The portlet collaboration execution section and the client collaboration execution section execute the notified processes, and order the portlet control section and the client AP control section to execute application functions necessary to the collaboration. The portlet control section and the client AP control section acquire an AP control rule that is necessary to the ordered function realization from the rule management section and execute the rule. The client AP control section particularly controls an application controlled via a GUI by analyzing a GUI screen to be displayed, extracting information from the screen, or sending an event to a button and a text input area on the screen.

An exemplary advantage according to the embodiment is that the application list installed in the client is sent to a Web portal and the collaboration decision section decides a collaboration process to be executed using the information at the connection of the Web portal, so appropriate collaboration is possible depending on an application installed in the client.

Further, an exemplary advantage according to the embodiment is that an AP control rule to control a particular portlet or client application and a collaboration rule that only describes collaboration among applications not depending on the particular portlet or client application are included. That is, the rule for collaboration among applications is retained being divided into a portion that depends on an individual application but not on collaboration content and a portion that does not depend on an individual application but depends on the collaboration content. Therefore, a particular AP control rule can be reused to control different collaboration contents, while the collaboration rule can be reused to control different individual applications. That is, an AP control rule for a certain application can be used for collaboration with other various applications, while a certain collaboration rule can be applied to various applications of the same type. Consequently, various collaboration between a Web portal and a large number of client applications can be easily realized.

Furthermore, an exemplary advantage according to the embodiment is that a GUI screen is analyzed for data extraction or an event following to user operation is sent, so a client application can be operated that is not assuming operation by other programs.

The embodiments can be applied to a Web portal system for assisting a user to use a plurality of applications including a client application.

EXAMPLE

Figure 16:
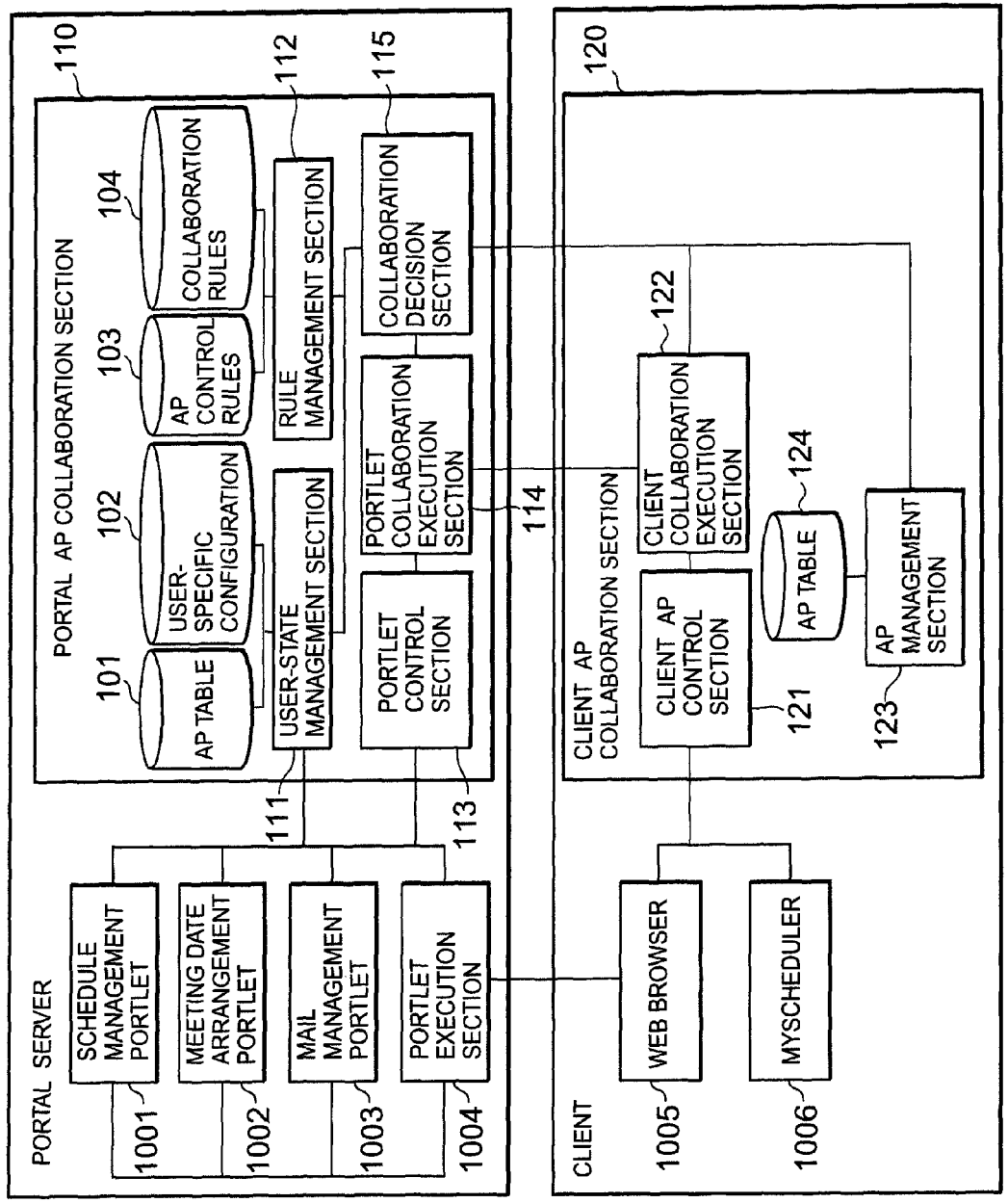
FIG. 16 is a block diagram showing a configuration example of a Web portal system according to this example.

Next, an example of the present invention will be described. FIG. 16 is a block diagram showing a configuration example of a Web portal system according to this example. A Web portal system shown in FIG. 16 includes a portal server 10 and a client 20.

The portal server 10 includes the portal AP collaboration section 110, a mail management portlet 1003, a meeting date arrangement portlet 1002 and a schedule management portlet 1001 as its portlets, and a portlet execution section 1004 that activates the portlets and generates screen images by the portlets.

The client 20 includes the client AP collaboration section 120 according to the present invention, a Web browser 1005 and a MyScheduler 1006 being a schedule management system.

FIG. 17 is an illustrative drawing showing a registration example of the user-specific configuration table 102. In the example shown in FIG. 17, a scheduler in use and an application used to arrange a meeting date are registered. Referring to FIG. 17, a scheduler, meeting date arrangement and mail management are set as application types, and the MyScheduler 1006, the meeting date arrangement portlet 1002 and the mail management portlet 1003 are set as application names corresponding to the respective types.

FIG. 18 is an illustrative drawing showing a registration example of the AP control rule table 103.

In the example shown in FIG. 18, an AP control rule is registered for an application name of each of the MyScheduler 1006, the schedule management portlet 1001, the mail management portlet 1003 and the meeting date arrangement portlet 1002.

FIG. 19 is an illustrative drawing showing a registration example of the collaboration rule table 104. In the example shown in FIG. 19, the following rules are registered: a collaboration rule 1 to display a mail management screen at the initial state; a collaboration rule 2 to automatically answer by displaying a plan on a meeting candidate date by the scheduler and by obtaining whether something is planned if a screen to input an answer for the arrangement of meeting date is displayed and a scheduler is available; and a collaboration rule 3 to simply display a candidate date on a calendar, if the screen to input an answer for the arrangement of meeting date is displayed and the scheduler is unavailable.

Next, the operation of a Web portal system in this example will be described. First, the AP management section 123 investigates an application installed in a client, and adds the found MyScheduler 1006 and Web browser 1005 to the AP table 124.

Next, when a user establishes connection to a Web portal using the Web browser 1005, the user-state management section 111 obtains an address of the connecting client, connects to the client AP collaboration section 120 on the client, obtains an AP list from the AP management section 123, and saves the list in its own AP table 101.

Next, the collaboration decision section 115 checks possible collaboration based on the collaboration rules set in the collaboration rule table 104. Since it is immediately after the connection, the collaboration rule 1 is decided to be selected herein. The collaboration rule 1 includes a collaboration implementation using the mail management application only. The collaboration decision section 115 determines that a mail management application used by a user is the mail management portlet 1003 based on user-specific configuration information set in the user-specific configuration table 102.

The collaboration decision section 115 also determines that a location to execute the mail management portlet 1003 is a portal based on the AP control rules set in the AP control rule table 103. The collaboration decision section 115 orders the portlet collaboration execution section 114 to activate the mail management application as a collaboration process based on a collaboration implementation set in the collaboration rule 1. Herein, no process is ordered to the client collaboration execution section 122.

The portlet collaboration execution section 114 that has received the order executes the process, indicates the mail management portlet 1003 as a name of an application to be processed to the portlet control section 113, and orders to activate the application for control.

The portlet control section 113 retrieves an AP control rule to activate the mail management portlet 1003 from the AP control rules and executes the rule. That is, the portlet control section 113 extracts an AP control rule whose application name is the mail management portlet 1003, and executes an interface implementation of the extracted AP control rule on the mail management portlet 1003. As a result, the mail management screen is displayed on the Web browser 1005 of a user. Since the execution of a collaboration process ends, the collaboration decision section 115 is waiting for an event.

Next, when a user carries out a task such as sending/receiving a mail using a screen of the mail management portlet 1003 displayed on a Web portal, an event such as new screen display is notified to the collaboration decision section 115. At each time of the notification, a activation condition is checked and it is checked whether there is any collaboration process to be executed.

Assume that a mail read by a user includes a request to arrange a meeting date, and a link to pre-determined meeting data in the meeting date arrangement portlet 1002 is embedded in the mail herein. When the user clicks the link to the meeting data in the mail to activate the meeting date arrangement portlet 1002, a screen is displayed to input an answer for the arrangement of meeting date in the portlet 1002. When this is notified to the collaboration decision section 115 as a screen display event, the collaboration decision section 115 extracts the collaboration rule 2 as a collaboration rule matching an activation condition, and checks the execution condition. Referring to FIG. 19, the execution condition of the collaboration rule 2 is that a scheduler is available. Since the MyScheduler 1006 being a scheduler of the user is installed in a client and is determined to be available, it is decided to execute the collaboration rule 2 herein.

Next, the collaboration decision section 115 confirms application names and execution locations of two types of applications "meeting date arrangement" and "scheduler" included in the collaboration implementation of the collaboration rule 2. Referring to the user-specific configuration table 102 shown in FIG. 17, the application names corresponding to "meeting date arrangement" and "scheduler" are "the meeting date arrangement portlet 1002" and "the MyScheduler 1006", respectively. Referring to the AP control rules 103 shown in FIG. 18, the execution locations corresponding to "the meeting date arrangement portlet 1002" and "the MyScheduler 1006" are "portal" and "client", respectively. Consequently, the collaboration decision section 115 decides to cause the portlet collaboration execution section 114 to execute a process to retrieve a candidate date from a meeting date arrangement system and a process to input the attendance/nonattendance on the candidate date to the meeting date arrangement system among processes in the collaboration implementation of the collaboration rule 2. The collaboration decision section 115 also decides to cause the client collaboration execution section 122 to execute a process to activate the scheduler and obtain a plan on the candidate date. The collaboration decision section 115 fixes process content embedded with a communication process among the respective processes, and make notification to both of the portlet collaboration execution section 114 and the client collaboration execution section 122.

The portlet collaboration execution section 114 that has received the notification first executes a call process of a candidate date obtaining function on the meeting date arrangement system. As a result, the portlet control section 113 is activated. The portlet control section 113 extracts an AP control rule to obtain a candidate date of the meeting date arrangement portlet 1002 from the rule management section 112 since the meeting date arrangement system is the meeting date arrangement portlet 1002. The portlet control section 113 executes the extracted AP control rule to obtain a candidate date from the meeting date arrangement portlet 1002 and passes the obtained result to the portlet collaboration execution section 114.

The portlet collaboration execution section 114 sends data of the candidate date to the client collaboration execution section 122, and executes a process to wait for attendance/nonattendance information.

When the client collaboration execution section 122 receives an order, it executes a process. The client collaboration execution section 122 first executes a process to receive the data of a candidate date, waits for the data to be sent, and then orders the client AP control section 121 to activate a scheduler.

The client AP control section 121 obtains and executes an AP control rule for a process to activate the MyScheduler 1006 being a scheduler, and then executes a process to obtain a plan on the candidate date by a plan obtaining function of the scheduler. In these processes, the client AP control section 121 obtains an AP control rule to obtain a plan of the MyScheduler 1006 from the rule management section 112.

The client AP control section 121 executes a process indicated by an interface implementation of an AP control rule. For example, as a process indicated by an interface implementation in which the MyScheduler is an AP for permitting control only by a GUI, the client AP control section 121 analyzes a GUI of the MyScheduler 1006, inputs data of a candidate date in a display date input field, sends a click event to a display button, analyzes the displayed schedule screen to retrieve a plan on the relevant date, and passes the plan to the client collaboration execution section 122.

The client collaboration execution section 122 determines whether or not something is planned on the date. If anything is planned, the section 122 decides nonattendance and sends the decision to the portlet collaboration execution section 114.

The portlet collaboration execution section 114 issues an order to the portlet control section 113 to input the result of nonattendance in the meeting date arrangement. The portlet control section 113 extracts the relevant AP control rule from the rule management section 112 and executes the rule, and inputs the result of nonattendance in an answer input screen of the meeting date arrangement.

Since the execution of the collaboration process ends, the collaboration decision section 115 again returns to the event waiting. If a user closes the Web browser 1005, the user-state management section 111 that has sensed the disconnection clears the AP table 101.

Next, the operation to execute the collaboration rule 3 shown in FIG. 19 will be described. A case will be described in that the same user borrows a client terminal of another user in which the MyScheduler 1006 is not installed to connect to the same Web portal, clicks a link to meeting data in a mail to activate the meeting date arrangement portlet 1002, so an answer input screen of meeting date arrangement is displayed similarly to the above example.

The collaboration decision section 115 extracts a collaboration rule matching a activation condition. Since the collaboration rule 2 satisfies the activation condition but a scheduler being an execution condition cannot be used, the collaboration rule 2 is not extracted, instead the collaboration rule 3 is extracted and executed.

An execution procedure of the collaboration rule 3 is similar to that of the collaboration rule 2. For example, the portlet control section 113 obtains a candidate date from the meeting date arrangement, and then executes a process to display a calendar of the candidate date using the calendar portlet on a Web portal.

While the invention has been particularly shown and described with reference to exemplary embodiments and example thereof, the invention is not limited to these embodiments and example. It will be understood by those of ordinary skill in the art that various changes in form and details may be made therein without departing from the spirit and scope of the present invention as defined by the claims.

What is claimed is:

1. An application collaboration system for allowing a portal application executed on a Web server and a client application executed on a client terminal to collaborate with each other, the application collaboration system comprising:
   a collaboration information storage device that stores collaboration information in association with information indicating an activation condition for extracting the collaboration information;
      wherein the collaboration information includes information indicating an application and call information used to call a process to be executed by the application;
   a collaboration decision device that determines whether or not the activation condition is satisfied;
   an execution location information storage device that stores execution location information in association with the information indicating an application;
      wherein the execution location information indicates an apparatus where the application is executed, the apparatus being either the Web server or the client terminal;
   an information extraction device that, if the collaboration decision device determines that the activation condition is satisfied, executes a process comprising:
      extracting, from said collaboration information storage device, collaboration information matching said activation condition; and
      acquiring, from said execution location information storage device, execution location information corresponding to the information indicating an application that is included in the extracted collaboration information; and
   a collaboration information notification device that notifies the apparatus indicated by the execution location information of the process indicated by the extracted collaboration information.

2. The application collaboration system according to claim 1 further comprising a specific-setting storage device that stores application identification information, which identifies the application, in association with application type information indicating a type of an application being available on the client terminal;
   wherein the collaboration information storage device stores collaboration information including the application type information as the information indicating an application;
   wherein the execution location information storage device stores the execution location information in association with the application identification information; and
   wherein the information extraction device extracts, from said specific-setting storage device, application identification information corresponding to the application type information included in the extracted collaboration information; and
   wherein the information extraction device acquires, from said execution location information storage device, execution location information corresponding to the extracted application identification information.

3. The application collaboration system according to claim 2, further comprising a control information storage device that stores control information, indicating a process to be executed by an application, in association with call information and application identification information,
   wherein the information extraction device extracts, from said control information storage device, control information corresponding to the extracted collaboration information and application identification information; and
   wherein the collaboration information notification device makes notification of a process indicated by the extracted collaboration information and control information.

4. The application collaboration system according to claim 3, wherein the control information storage device stores control information indicating processes to analyze a GUI screen outputted by the client application, extract data and send a GUI event.

5. The application collaboration system according to claim 3, wherein the control information storage device stores control information indicating processes to analyze a GUI screen outputted by the portal application, extract data and send a GUI event.

6. The application collaboration system according to any one of claims 1, wherein the Web server comprises a portlet execution device that executes processes according to the information notified by the collaboration information notification device; and
   wherein the client terminal comprises a client execution device that executes processes according to the information notified by the collaboration information notification device.

7. An application collaboration method of allowing a portal application executed on a Web server and a client application executed on a client terminal to collaborate with each other, the application collaboration method including:
   a collaboration information storage operation of storing, in a collaboration information storage device, collaboration information in association with information indicating an activation condition for extracting the collaboration information;
      wherein the collaboration information includes information indicating an application and call information used to call a process to be executed by the application;

a collaboration decision operation, executed by a collaboration decision device, comprising determining whether or not the activation condition is satisfied;

an execution location information storage operation of storing, in an execution location information storage device, execution location information in association with the information indicating an application;

wherein the execution location information indicates an apparatus where the application is executed, the apparatus being either the Web server or the client terminal;

an information extraction operation comprising, if the activation condition is satisfied, then:

extracting, by an extracting device, from said collaboration information storage device, collaboration information matching said activation condition; and acquiring, by an acquiring device, from said execution location information storage device, execution location information corresponding to the information indicating an application that is included in the extracted collaboration information; and a collaboration information notification operation of notifying, by a collaboration information notification device, the apparatus indicated by the execution location information of the process indicated by the extracted collaboration information.

8. The application collaboration method according to claim 7, further including a specific-setting storage operation of storing, in a specific-setting storage device, application identification information, which identifies the application, in association with application type information indicating a type of an application being available on the client terminal;

wherein the collaboration information storage operation includes storing, in the collaboration information storage device, collaboration information including the application type information as the information indicating an application;

wherein the execution location information storage operation includes storing, in the execution location information storage device, the execution location information in association with the application identification information; and wherein the information extraction operation includes:

extracting, from said specific-setting storage device, application identification information corresponding to the application type information included in the extracted collaboration information; and acquiring, from said execution location information storage device, execution location information corresponding to the extracted application identification information.

9. The application collaboration method according to claim 8, further including a control information storage operation of storing, in a control information storage device, control information, indicating a process to be executed by an application, in association with call information and application identification informations;

wherein the information extraction operation includes extracting, from said control information storage device, control information corresponding to the extracted collaboration information and application identification information; and wherein the collaboration information notification operation includes making notification of a process indicated by the extracted collaboration information and control information.

10. A non-transitory computer-readable storage medium storing an application collaboration program for allowing a portal application executed on a Web server and a client application executed on a client terminal to collaborate with each other, the application collaboration program causing a computer to execute processes comprising:

determining, by a collaboration decision device, whether or not an activation condition is satisfied for extracting collaboration information from a collaboration information storage device;

an information extraction process comprising, if the activation condition is satisfied, then:

extracting, by an extracting device, from the collaboration information storage device, collaboration information matching the activation condition;

wherein the collaboration information includes information indicating an application and call information used to call a process to be executed by the application; and wherein the collaboration information is stored in association with information indicating said activation condition; and acquiring, by an acquiring device, from an execution location information storage device, execution location information corresponding to the information indicating an application that is included in the extracted collaboration information;

wherein the execution location information storage device stores execution location information, indicating an apparatus where the application is executed, the apparatus being either the Web server or the client terminal;

wherein the execution location information is stored in association with the information indicating an application; and a collaboration information notification process of notifying, by a collaboration information notification device, the apparatus indicated by the execution location information of the process indicated by the extracted collaboration information.

11. The non-transitory computer-readable storage medium storing the application collaboration program according to claim 10, wherein the collaboration information includes application type information indicating an application type as information indicating the application;

wherein the execution location information is information associated with application identification information that identifies the application; and wherein the information extraction process further includes:

extracting, from a specific-setting storage device, application identification information corresponding to the application type information included in the extracted collaboration information, wherein the specific-setting storage device stores application identification information, which identifies the application, in association with application type information indicating a type of an application available on the client terminal; and acquiring, from the execution location information storage device, execution location information corresponding to the extracted application identification information.

12. The non-transitory computer-readable storage medium storing the application collaboration program according to claim 11, wherein the information extraction process further includes extracting, from a control information storage device, control information corresponding to the extracted collaboration information and application identification information,
  wherein the control information storage device stores control information, indicating a process to be executed by the application, in association with call information and application identification information; and the collaboration information notification process includes making notification of a process indicated by the extracted collaboration information and control information.

* * * * *